J. L. HALL.
TELLTALE FOR COMPASSES OR THE LIKE.
APPLICATION FILED JAN. 7, 1911.

1,091,653.

Patented Mar. 31, 1914.

Witnesses:
George W. Tilden
J. Ellis Glen

Inventor:
John L. Hall,
by Albert G. Davis
His Attorney.

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

TELLTALE FOR COMPASSES OR THE LIKE.

1,091,653.   Specification of Letters Patent.   Patented Mar. 31, 1914.

Application filed January 7, 1911. Serial No. 601,269.

*To all whom it may concern:*

Be it known that I, JOHN L. HALL, a citizen of the United States, residing at Schenectady, county of Schenectady, State of New York, have invented certain new and useful Improvements in Telltales for Compasses or the like, of which the following is a specification.

This invention relates to indicating apparatus such as magnetic compasses or the like, one of the objects of my invention being to provide means whereby an auxiliary indicator or tell-tale may be located at a point remote from the main indicator and give the same indications as are given by the indicator.

My invention is particularly applicable to magnetic compasses such as ships' compasses in which it is desirable that the movements of the compass be indicated in various parts of the ship.

In carrying out my invention I provide in connection with the main compass needle one or more auxiliary indicators or tell-tales and electrical connections between the two whereby the auxiliary indicator moves to correspond with the main indicator. As a convenient means of causing the auxiliary indicator to move simultaneously with the main indicator I employ a synchronous motor connected with the main indicator in such a way that a very slight movement of the main indicator is instantly communicated to the auxiliary indicator. Any number of these auxiliary indicators or tell-tales may be located at various parts of the ship and may be located at any reasonable distance from the main compass.

Figure 1:
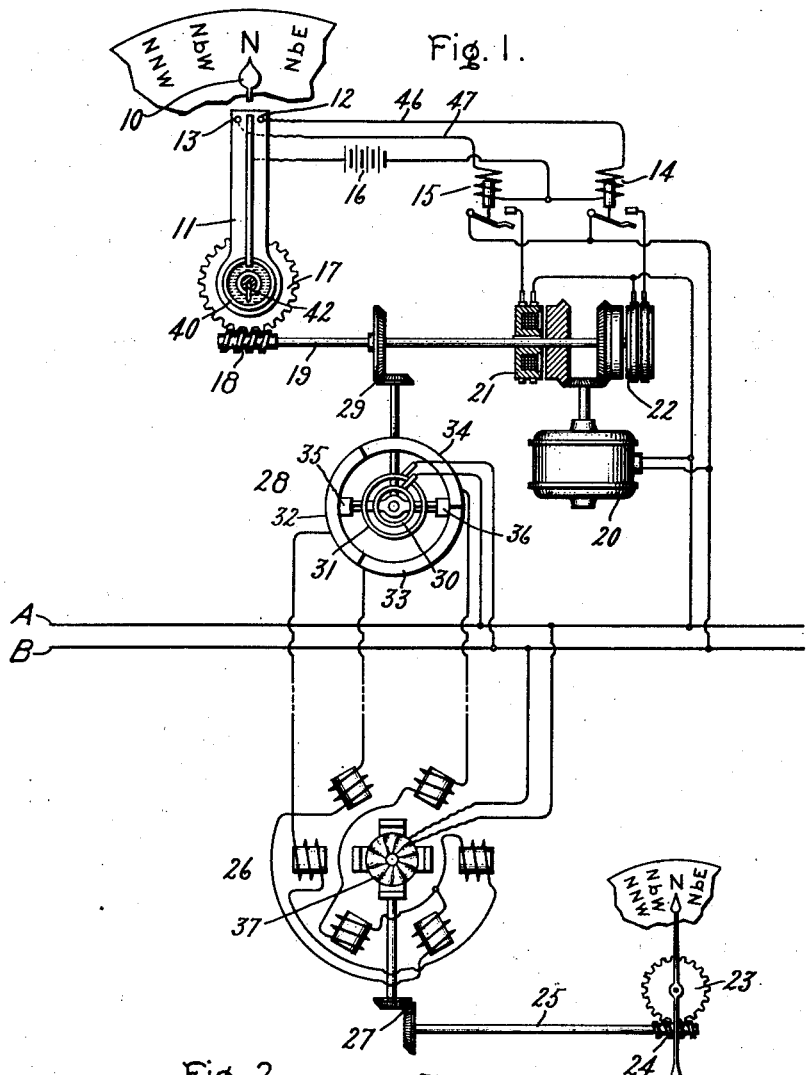
Figure 2:
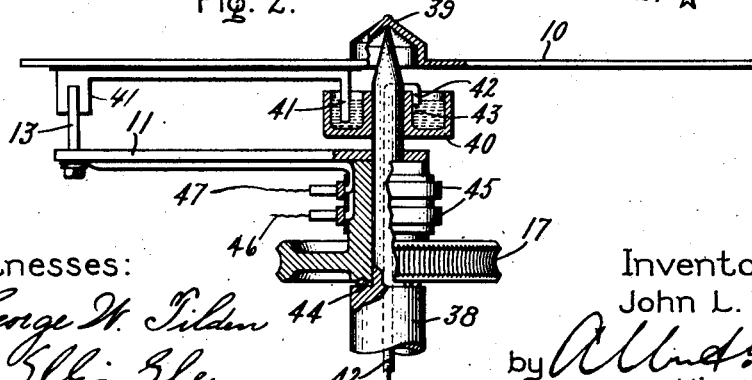

In the accompanying drawing in which I have shown my invention embodied in concrete form, Figure 1 is a complete view of one form of my apparatus; and Fig. 2 is a detail of the circuit connections with the magnetic needle.

Referring to the drawings, 10 represents the magnetic needle of an ordinary compass, which may be a ship's compass having a suitable dial marked in the usual way. Pivoted concentrically with the needle is a contact member 11 having contacts 12 and 13, one on each side of the needle. These contacts 12 and 13 are for closing a circuit through contactors 14 and 15, energized by battery 16. That is, when the contact on the compass needle engages the stud 12, contactor 14 will be energized and when the stud 13 is engaged contactor 15 will be energized. The member 11 is arranged to be rotated by means of a worm wheel 17 engaged by worm 18 mounted on shaft 19. This shaft 19 is driven in one direction or the other by means of a motor 20 which is constantly running. Two magnetic clutches 21 and 22 are provided, controlled respectively by the contactors 15 and 14, the arrangement being such that when the contactor 15 is energized the magnetic clutch 21 will be accordingly magnetized to cause the shaft to rotate in one direction, while if the contactor 14 is energized the clutch 22 will be magnetized and cause the shaft to rotate in the opposite direction.

At 23 I have shown an auxiliary indicator or tell-tale consisting of a pointer operated through worm 24 on shaft 25. This shaft 25 is operated by the synchronous motor 26 through the beveled gearing 27. This motor is controlled by the controller 28 driven from the shaft 19 by beveled gearing 29. This controller consists of two inner collector rings 30 and 31 connected by brushes with the mains A B and an outer stationary ring divided into three insulated segments 32, 33 and 34 connected with the various coils of the motor. A pair of brushes 35 and 36 engage the inner surface of these rings and are rotated with the rings 30 and 31 through gearing 29. Brush 35 is electrically connected with ring 31 and brush 36 with ring 30. The rotor 37 of the motor is separately excited across the mains A B. By this arrangement, the direct current supply A B is converted into currents having three phase relation which are conducted to stator of the motor. As the shaft 19 rotates, the slip rings 30 and 31 and the brushes 35 and 36 are rotated, thereby energizing the coils of the stator so that the rotor which is always of the same polarity will be rotated to correspond with the movement of the controller. The motor 20 is connected across the mains A B and the magnetic clutches 22 and 21 likewise receive current from the same source.

In Fig. 2 I have shown a detail of the circuit closing contact of the needle. The central post 38 of the compass terminates in a point which forms a pivot for the needle 10 at 39. Secured to the pivoted post just below the needle is a mercury cup 40 into which dips a contact 41 secured to but insulated from the needle. A conducting wire 42 passes up through the center of the post and likewise dips in the mercury cup at 43. The worm wheel 17 is mounted so as to turn freely upon the post and a ball bearing 44 is provided between the wheel and a shoulder on the post, as shown. The gear 17 is provided with a hub upon which are mounted the collector rings 45. One of these rings is connected with each of the contact posts 12 and 13 by conductors 46 and 47. These posts project upward through the contact member 11 secured to and moving with the hub of the gear 17. The contact 41 projects downward between the posts 12 and 13, as shown, so that if the needle is moved in one direction it engages one post, while if it is moved in the opposite direction it engages the other post.

As thus constructed and arranged, the operation will be as follows, assuming that the parts are in the position shown in Fig. 1 and that the magnetic needle moves to the right. A very slight movement of the needle brings it into contact with the post 12, thereby energizing the contactor 14 by means of the battery 16. The energizing of the contactor 14 causes the circuit of the magnetic clutch 22 to be closed across the line A B, thereby causing the shaft 19 to be turned in one direction by the motor. The connections are such that when the post 12 is engaged, the shaft 19 will be rotated in a direction to rotate the member 11 in a clockwise direction so as to move the contact 12 away from the needle. At the same time the controller 28 has likewise been moved by the shaft 19 a corresponding amount so that the motor 26 is so energized as to move its rotor 37 a corresponding amount. The rotor in turn rotates the tell tale 23. If the needle passes still farther to the right the post will again be engaged, and the tell-tale will be moved another step in response to the movement of the contact 11. In this way the tell-tale will be shifted around to correspond with the movements of the needle. If the needle moves in the opposite direction the post 13 will be engaged, thereby energizing the contactor 15 so as to rotate the shaft 19 in the opposite direction. This will cause the controller to rotate in the opposite direction and cause the rotor of the synchronous motor 26 and the tell-tale to be oppositely rotated in a manner well understood.

By the arrangement described it will be seen that I am able to locate any number of indicators or tell-tales in various parts of a ship and at any time these tell-tales will give the exact indication of the main compass needle. Each tell-tale is provided with a small synchronous motor, any number of which may be connected with the controller 28. In the construction shown the motor 20 rotates continuously, although of course my invention is in no sense limited to this nor to any other specific arrangement nor to any of the other structural features except in so far as it is limited by the scope of the claims annexed hereto.

What I claim as new and desire to secure by Letters Patent of the United States, is,—

1. The combination with a magnetic needle of a compass, of a contact member coöperating therewith, electromagnetic means for causing said member to follow the movements of said needle, an auxiliary indicator, a motor for driving said indicator, a controller for said motor operated by said electromagnetic means.

2. The combination with the magnetic needle of a compass, of a contact member coöperating therewith, means for causing said member to follow the movements of said needle, an auxiliary indicator, a synchronous motor, and means whereby said indicator is automatically moved by said motor to correspond to the movements of said contact member.

3. The combination with the magnetic needle of a compass, of a contact member coöperating therewith, means for causing said member to follow the movements of said needle, an auxiliary indicator, a synchronous motor for operating said indicator, controlling means for said motor, and means for causing said contact member and controlling means to be moved simultaneously.

4. The combination with a magnetic needle of a compass, of a contact member having contacts coöperating with the needle, electromagnetic means for operating said contact member controlled by said contacts, an auxiliary indicator, an electric motor for driving the same, and a controller for said motor operated by said electromagnetic means.

5. The combination with a magnetic needle of a compass, of a contact member having contacts coöperating with the needle, a continuously operating electric motor for driving said contact member, an electromagnetic clutch controlled by said contacts for controlling the connections between the motor and the contact members, an auxiliary indicator, an electric motor for driving said indicator, and a controller for said latter motor operated by said first mentioned motor.

6. The combination with the magnetic needle of a compass, of a contact member pivoted concentrically therewith and having contacts coöperating with the needle, electromagnetic means controlled by said contacts for moving the contact member out of engagement with the needle, an auxiliary indicator, a synchronous motor for driving said indicator, a circuit controller for said motor driven by the electromagnetic means, and connections whereby the motor moves in synchronism with the controller.

In witness whereof, I have hereunto set my hand this 6th day of January, 1911.

JOHN L. HALL.

Witnesses:
BENJAMIN B. HULL,
HELEN ORFORD.